US012671937B2

(12) United States Patent
Wang

(10) Patent No.: US 12,671,937 B2
(45) Date of Patent: Jun. 30, 2026

(54) MINIATURE LOUDSPEAKER

(71) Applicant: MERRY ELECTRONICS (SUZHOU) CO., LTD., Jiangsu Province (CN)

(72) Inventor: Jingui Wang, Jiangsu Province (CN)

(73) Assignee: MERRY ELECTRONICS (SUZHOU) CO., LTD., Jiangsu Province (CN)

( * ) Notice: Subject to any disclaimer, the term of this patent is extended or adjusted under 35 U.S.C. 154(b) by 200 days.

(21) Appl. No.: 18/667,017

(22) Filed: May 17, 2024

(65) Prior Publication Data

US 2024/0397254 A1 Nov. 28, 2024

(30) Foreign Application Priority Data

May 22, 2023 (CN) ........................ 202310579749.5

(51) Int. Cl.

| | |
|---|---|
| ***H04R 25/00*** | (2006.01) |
| ***H04R 1/02*** | (2006.01) |
| ***H04R 1/28*** | (2006.01) |
| ***H04R 9/02*** | (2006.01) |
| *H04R 7/18* | (2006.01) |

(52) U.S. Cl.

CPC ........... *H04R 1/2842* (2013.01); *H04R 1/025* (2013.01); *H04R 1/2857* (2013.01); *H04R 9/025* (2013.01); *H04R 7/18* (2013.01)

(58) Field of Classification Search

CPC .... H04R 1/2842; H04R 1/025; H04R 1/2857; H04R 9/025; H04R 7/18

USPC ........................................................ 381/345

See application file for complete search history.

(56) References Cited

U.S. PATENT DOCUMENTS

2022/0394389 A1* 12/2022 Gerkinsmeyer ......... H04R 7/10

FOREIGN PATENT DOCUMENTS

| | | |
|---|---|---|
| CN | 103167387 A | 6/2013 |
| CN | 204948336 U | 1/2016 |
| CN | 108449693 A | 8/2018 |
| CN | 109168115 A | 1/2019 |
| CN | 210431868 U | 4/2020 |
| CN | 210781334 U | 6/2020 |
| CN | 214101685 U | 8/2021 |
| CN | 214675665 U | 11/2021 |
| CN | 215222487 U | 12/2021 |
| CN | 215300906 U | 12/2021 |
| CN | 115643333 A | 1/2023 |

(Continued)

*Primary Examiner* — Phylesha Dabney

(74) *Attorney, Agent, or Firm* — Birch, Stewart, Kolasch & Birch, LLP

(57) ABSTRACT

A miniature loudspeaker comprises a housing, a magnetic circuit system arranged in the accommodating space of the housing and provided with a first tuning hole, a vibration system arranged at the opening of the housing and including a voice coil and a diaphragm which provided with a second tuning hole, a damper provided with a third tuning hole, and a control circuit. Two ends of the damper are respectively connected with the magnetic circuit system and the diaphragm. A resonant cavity is formed between the magnetic circuit system and the housing. The first tuning hole, the third tuning hole and the second tuning hole cooperate to form a sound guide channel connecting the outside and the resonant cavity. The control circuit inputs direct-current bias current to the voice coil to adjusts initial position of the diaphragm, and the damper lengthens or shortens with the change of the initial position.

20 Claims, 9 Drawing Sheets

(56) References Cited

FOREIGN PATENT DOCUMENTS

| | | | |
|---|---|---|---|
| CN | 218301631 | U | 1/2023 |
| CN | 219068351 | U | 5/2023 |
| CN | 219761309 | U | 9/2023 |
| JP | 9-130889 | A | 5/1997 |
| JP | 7266331 | B1 | 4/2023 |
| TW | M483626 | U | 8/2014 |
| TW | M493213 | U | 1/2015 |

* cited by examiner

MINIATURE LOUDSPEAKER

CLAIM OF PRIORITY AND CROSS-REFERENCE TO RELATED APPLICATION(S)

This application claims the benefit of Chinese Patent Application No. 202310579749.5, filed on May 22, 2023, which is incorporated herein by reference in its entirety.

BACKGROUND OF THE DISCLOSURE

1. Field of the Disclosure

The present disclosure relates to the field of audio equipment, and particularly to a miniature loudspeaker.

2. Description of the Related Art

Miniature loudspeaker is a very commonly used electroacoustic transducer, widely used in small electronic products such as mobile phones, tablet computers, PC speakers, watches, etc. The moving coil loudspeaker transmits an electrical signal to the voice coil in the magnetic gap generated by the magnetic circuit system, which makes the voice coil move under the ampere force and promotes the diaphragm vibration, thus promoting the sound production in the air. At present, most of the miniature loudspeakers in the market are designed in the full frequency range, which can not amplify the frequency response of a specific frequency band.

BRIEF DESCRIPTION OF THE DISCLOSURE

In view of this, the object of the disclosure is to provide a miniature loudspeaker to amplify the frequency response of a particular frequency band under the condition of limiting the size of the shape.

The embodiment of the disclosure provides a miniature loudspeaker. The miniature loudspeaker comprises a housing, with an opening at the top to form an accommodating space; a magnetic circuit system, disposed in the accommodating space, having a spacing from the housing to form a resonant cavity, and being provided with a first tuning hole communicating with the resonant cavity; a vibration system, disposed at the opening of the housing and comprising a diaphragm and a voice coil, the diaphragm being provided with a second tuning hole communicating with the outside; a damper, configured as a ring structure to form a third tuning hole, two ends of the spring wave being respectively connected to the magnetic circuit system and the diaphragm; and a control circuit, configured to input a direct-current bias current to the voice coil to adjust an initial position of the diaphragm; wherein the first tuning hole, the third tuning hole, and the second tuning hole cooperate to form a sound guiding channel, and the damper extends or shortens following the change of the initial position of the diaphragm to make different direct currents correspond to different lengths of the sound guiding channel.

Further, the housing is provided with at least one fixing part, and the housing is fixedly connected to the magnetic circuit system through the fixing part.

Further, the magnetic circuit system comprises: a magnetic bowl, having a spacing from the housing to form the resonant cavity, and being fixedly connected to the fixing part; a magnet, disposed above the magnetic bowl; and a top sheet, disposed above the magnet; wherein the first tuning hole penetrates through the magnetic bowl, the magnet, and the top sheet.

Further, both ends of the damper are respectively connected to the top sheet and the diaphragm.

Further, the magnetic bowl comprises: a main body part; and a side part, extending upward from the edge of the main body part, and fixedly connected to the fixing part; a side part, extending upward from the edge of the main body part, and fixedly connected to the fixing part;

Further, the housing comprises: a base plate, having a distance from the main body part; and a side wall, extending upward from the edge of the base plate, having a distance from the side part, and extending inward to form the fixing part.

Further, the side part is recessed on one side facing the side wall to form a containing groove; and the fixing part extends into the containing groove to be fixedly connected to the side part.

Further, the containing groove is located at the top of the side part.

Further, a plurality of the fixing parts are arranged at intervals to cooperate with the magnetic circuit system to form leaks that communicate with the resonant cavity.

Further, the first tuning hole, the second tuning hole, and the third tuning hole jointly form the sound guide channel that is wide at the top and narrow at the bottom.

Further, a positioning groove is provided at the opening of the housing; and the edge of the diaphragm is positioned in the positioning groove.

Further, the damper comprises: a support part, arranged in a ring structure; a first connection part, extending from the upper end of the support part in a direction away from the sound guide channel, and connected to the diaphragm; and a second connection part, extending from the lower end of the support part in a direction away from the sound guide channel, and connected to the magnetic circuit system.

Further, the cross section of the support part is set to be V-shaped and recessed in the direction away from the sound guide channel.

Further, the cross section of the support part is set to be serrated.

Further, the cross section of the support part is set to be circular arc-shaped, and is recessed towards the direction away from the sound guide channel.

Further, the diaphragm comprises: a diaphragm body; and a reinforcement member, attached to the diaphragm body; wherein the second tuning hole penetrates through the diaphragm body and the reinforcement member.

Further, the miniature loudspeaker is provided with a revolving body structure.

Further, the bore diameter of the first tuning hole is equal to the bore diameter of the second tuning hole.

Further, the bore diameter of the third tuning hole is equal to the bore diameters of the first tuning hole and the second tuning hole.

Further, the bore diameter of the third tuning hole is larger than the bore diameters of the first tuning hole and the second tuning hole.

The embodiment of the disclosure provides a miniature loudspeaker, which comprises a housing, a magnetic circuit system, a vibration system, a damper and a control circuit. The magnetic circuit system is arranged in the accommodating space of the housing, the vibration system is arranged at the opening of the housing and includes a diaphragm and a voice coil, and the two ends of the damper are respectively connected with the magnetic circuit system and the diaphragm. A resonant cavity is formed between the magnetic circuit system and the housing, the magnetic circuit system is provided with a first tuning hole, the diaphragm is provided with a second tuning hole, and the damper is arranged as a ring structure to form a third tuning hole. The first tuning hole, the third tuning hole and the second tuning hole cooperate to form a sound guide channel connecting the outside and the resonant cavity. The control circuit inputs direct-current bias current to the voice coil to adjust the initial position of the diaphragm, and the damper lengthens or shortens with the change of the initial position of the diaphragm so that different direct currents correspond to different lengths of sound guide channels. Thus, by setting a resonant cavity and a variable sound guide channel, the frequency response of a specific frequency band may be amplified under the condition of limiting the size of the miniature loudspeaker, thus achieving the maximum volume output.

BRIEF DESCRIPTION OF THE DRAWINGS

By following the description of the embodiment of the disclosure with reference to the drawings, the above and other purposes, features and advantages of the disclosure will be clearer, in the drawings.

DETAILED DESCRIPTION OF EMBODIMENTS OF THE DISCLOSURE

The present disclosure is described below based on embodiments, but the disclosure is not limited to these embodiments. In the following detailed description of the disclosure, some specific details are described in detail. The present disclosure can be fully understood without the description of these details for those skilled in the art. In order to avoid confusing the essence of the disclosure, the well-known methods, processes, processes, components and circuits are not described in detail.

In addition, those of ordinary skill in the art should understand that the drawings provided here are for illustrative purposes and that they are not necessarily drawn to scale.

Unless the context expressly requires, similar words such as "including" and "containing" in the specification should be interpreted as inclusive rather than exclusive or exhaustive; that is, the meaning of "including, but not limited to".

In the description of the present disclosure, it is to be understood that the terms "first", "second" and the like are used only for descriptive purposes and cannot be understood to indicate or imply relative importance. In addition, in the description of the present disclosure, unless otherwise stated, "multiple" means two or more.

For ease of illustration, space-related terms such as "inside", "outside", "under", "below", "lower", "above", "upper", "left", "right" and the like are used here to describe the relationship between one component or feature and another element or feature illustrated in the diagram. It will be understood that space-related terms may be intended to include different directions in the use or operation of the equipment in addition to those depicted in the diagram. For example, if the device in the figure is flipped, the element described as "below" or "under" another component or feature will then be positioned "above" the other component or feature. Therefore, the example term "below" can include both the upper and lower orientations.

Figure 1:
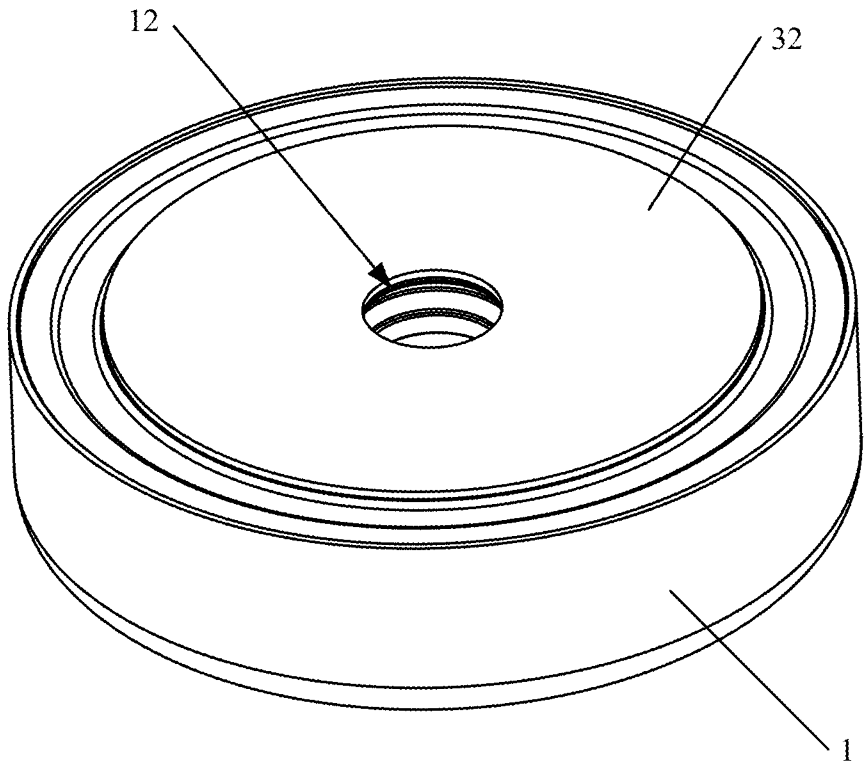
FIG. 1 is a structural diagram of a miniature loudspeaker provided by an embodiment of the present disclosure.
Figure 2:
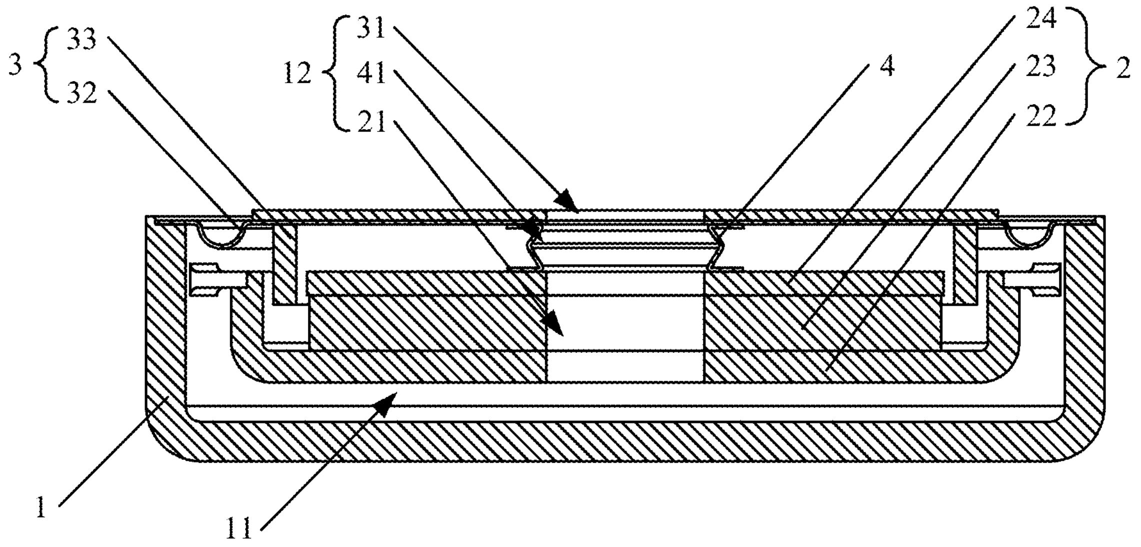
FIG. 2 is a profile diagram of a miniature loudspeaker provided by an embodiment of the present disclosure.
Figure 3:
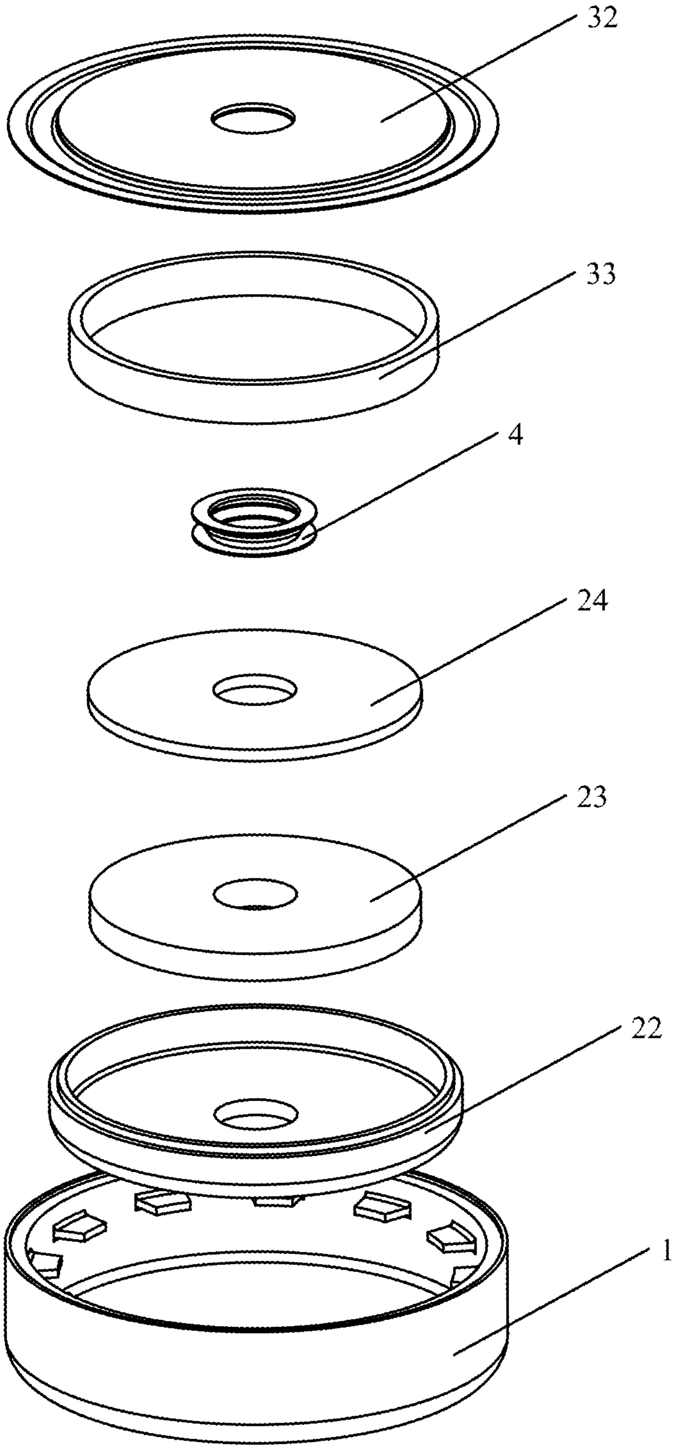
FIG. 3 is an exploded diagram of a miniature loudspeaker provided by an embodiment of the present disclosure.
Figure 4:
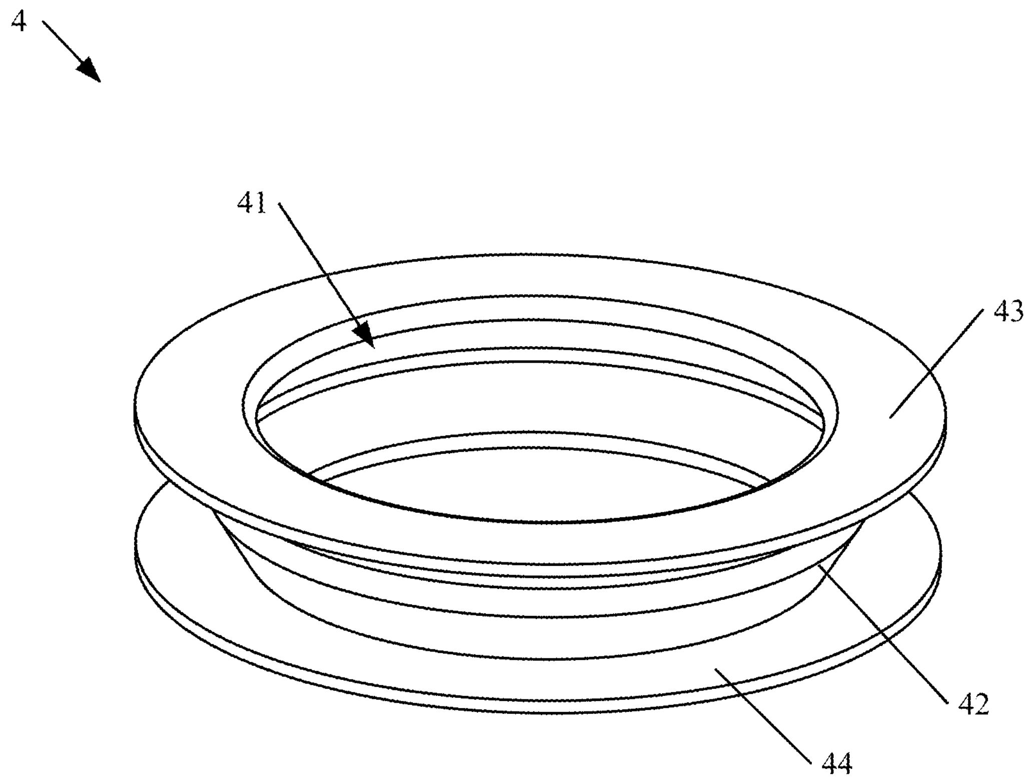
FIG. 4 is a structural diagram of a blast wave provided by an embodiment of the present disclosure.

FIG. 1 is a structural diagram of a miniature loudspeaker provided by an embodiment of the present disclosure. As shown in FIG. 1, the miniature loudspeaker provided by the embodiment of the present disclosure is arranged in a cylindrical structure, that is, a revolving body structure. As an optional embodiment, the cross-section of the miniature loudspeaker may also be arranged in a rectangular or elliptical shape or other shapes. Further, FIG. 2 is a profile diagram of a miniature loudspeaker provided by an embodiment of the present disclosure, and FIG. 3 is an exploded diagram of a miniature loudspeaker provided by an embodiment of the present disclosure. As shown in FIG. 2 and FIG. 3, the miniature loudspeaker includes a housing 1, a magnetic circuit system 2, a vibration system 3, and a damper 4. Specifically, the top of the housing 1 is equipped with an opening to form an accommodating space communicating with the outside. The magnetic circuit system 2 is arranged in the accommodating space inside the housing 1 and is adapted to form a magnetic gap area for generating a magnetic field. As shown in FIG. 2, the magnetic circuit system 2 has a spacing from the housing 1, so as to cooperate with the bottom of the housing 1 to separate the interior of the housing 1 to form a resonant cavity 11. At the same time, the magnetic circuit system 2 is provided with a first tuning hole 21 communicating with the resonant cavity 11. As shown in FIG. 2 and FIG. 3, the vibration system 3 is arranged at the opening of the housing 1 and includes a diaphragm 32 and a voice coil 33. At the same time, the diaphragm 32 is provided with a second tuning hole 31 communicating with the outside. FIG. 4 is a structural diagram of a blast wave provided by an embodiment of the present disclosure. As shown in FIG. 2 and FIG. 4, the damper 4 is arranged in a ring structure to form a third tuning hole 41. At the same time, both ends of the damper 4 are connected to the magnetic circuit system 2 and the diaphragm 32 respectively, so as to align and connect the third tuning hole 41 to the first tuning hole 21 and the second tuning hole 31 respectively.

As shown in FIG. 2, the first tuning hole 21, the third tuning hole 41 and the second tuning hole 31 are located on the same axis and cooperate to form a sound guide channel 12 that communicating with the resonant cavity 11 and the outside. The sound guide channel 12 is located at the center of the miniature loudspeaker to ensure the stability of vibration. It should be noted that the sound signal may be physically divided based on the Helmholtz resonant principle by setting the resonant cavity 11 to optimize the sense of hearing. It needs to be further noted that the damper 4 is clastic and may produce clastic deformation along the vertical direction. The miniature loudspeaker also includes a control circuit which may input a direct-current bias current to the voice coil 33 so as to adjust the initial position of the diaphragm 32 through the movement of the voice coil 33. At the same time, the damper 4 may be elastically deformed with the movement of the diaphragm 32 to change the length of the sound guide channel 12. That is, when the initial position of the diaphragm 32 changes, the damper 4 lengthens or shortens, resulting in an increase or decrease in the length of the third tuning hole 41, so that different direct currents correspond to different lengths of the sound guiding channel 12. It is easy to understand that when the diaphragm 32 moves upward, the damper 4 is stretched, and the sound guide channel 12 becomes longer; when the diaphragm 32 is moved downward, the damper 4 is compressed, and the sound guide channel 12 becomes shorter. Thus, by setting a sound guide channel 12 connecting the resonant cavity 11 and the outside, it is possible to use the sound guide design to conduct and superimpose amplification of sound waves in the resonant cavity along the sound generation direction, thereby amplifying the frequency response of a specific frequency band under the condition of limiting the shape size of the miniature loudspeaker to achieve the maximum volume output. At the same time, the length of the sound guide channel 12 may be changed by using the control circuit and the clastic deformation structure of the damper 4, so as to change the resonant frequency, thereby maximizing the output sound pressure of a specific frequency.

Figure 5:
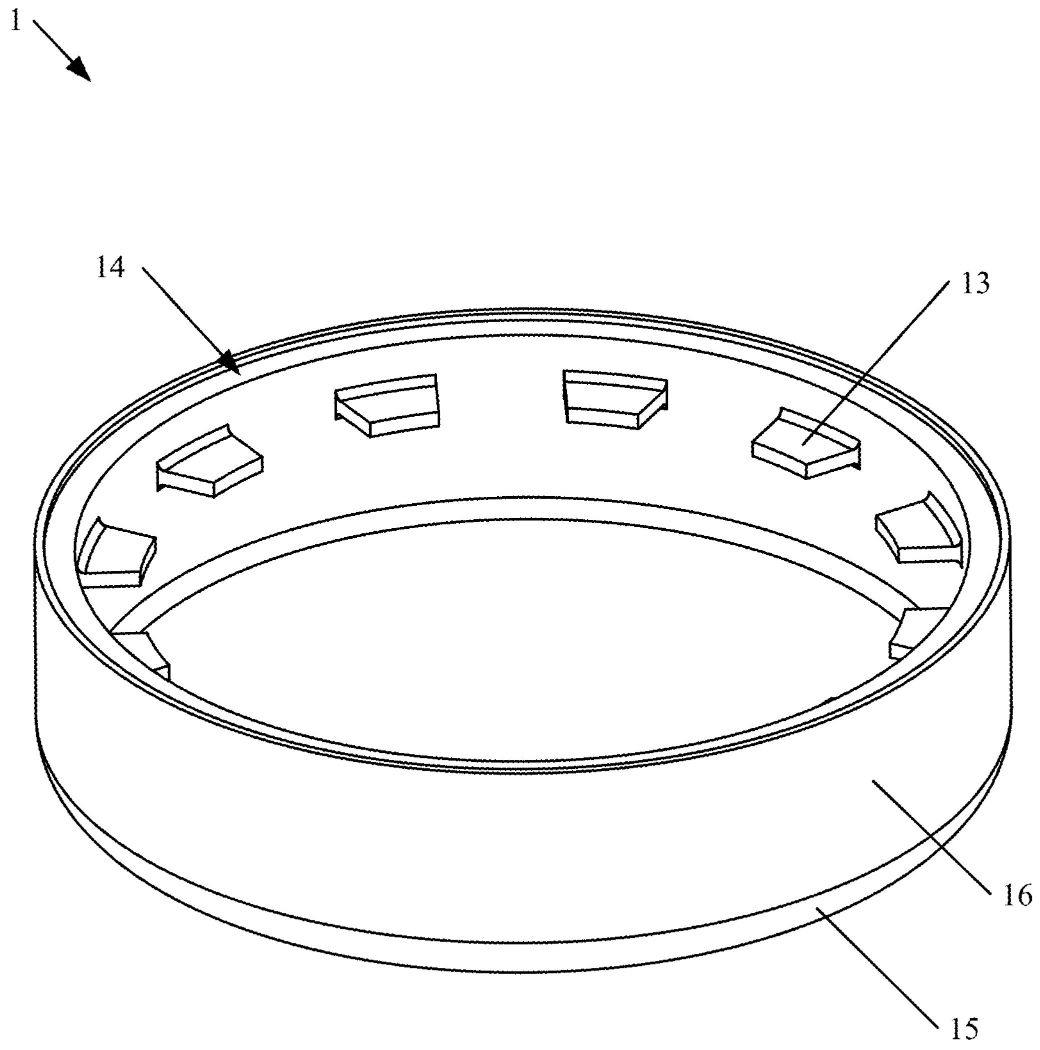
FIG. 5 is a structural diagram of a housing provided by an embodiment of the present disclosure.

FIG. 5 is a structural diagram of a housing provided by an embodiment of the present disclosure. As shown in FIG. 5, in one embodiment, at least one fixing part 13 is arranged on the housing 1. It is easy to understand that the housing 1 is fixedly connected to the magnetic circuit system 2 through the fixing part 13. That is to say, the magnetic circuit system 2 is suspended in the accommodating space of the housing 1 by a fixed connection with the fixing part 13. That is, the magnetic circuit system 2 is installed in the housing 1.

Figure 6:
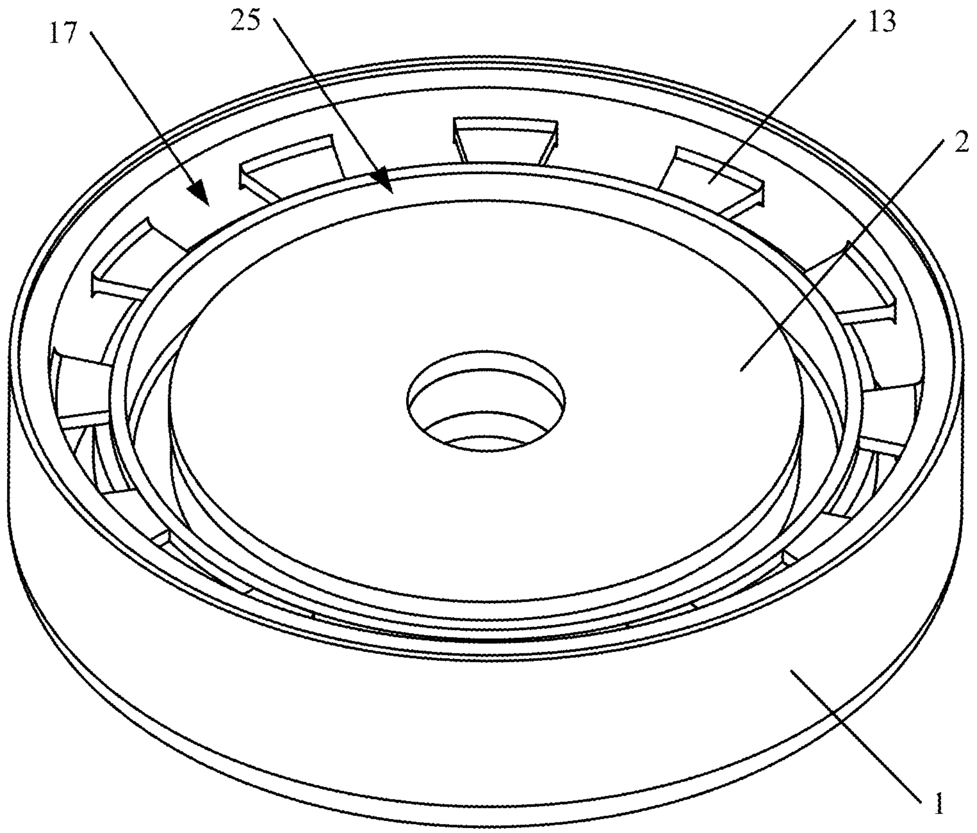
FIG. 6 is a schematic diagram of the installation of a magnetic circuit system provided by an embodiment of the present disclosure.

FIG. 6 is a schematic diagram of the installation of a magnetic circuit system provided by an embodiment of the present disclosure. As shown in FIG. 6, in one embodiment, a plurality of fixing parts 13 are arranged at intervals so that leaks 17 connected with the resonant cavity 11 may be formed in conjunction with the magnetic circuit system 2. Thus, when the miniature loudspeaker is working, the internal air may flow through the leaks 17, which can not only ensure the formation of a Helmholtz resonant cavity, but also improve the heat dissipation capacity of the miniature loudspeaker, thereby helping to avoid distortion.

As shown in FIG. 2, in one embodiment, the magnetic circuit system 2 includes a magnetic bowl 22, a magnet 23, and a top sheet 24. Specifically, the magnetic bowl 22 is spaced from the housing 1, thereby forming a resonant cavity 11. It is easy to understand that the magnetic bowl 22 is fixedly connected with the fixing parts 13. Further, the magnet 23 is arranged above the magnetic bowl 22, and the top sheet 24 is arranged above the magnet 23. Furthermore, the first tuning hole 21 runs through the magnetic bowl 22, the magnet 23 and the top sheet 24. That is, the magnetic bowl 22, the magnet 23 and the top sheet 24 are provided with mutually matched through holes to cooperate to form the first tuning hole 21. In the present embodiment, the magnetic circuit system 2 generates a magnetic field through the magnetic bowl 22, the magnet 23 and the top sheet 24 so that the voice coil 33 drives the diaphragm 32 to vibrate under the action of the magnetic field.

Figure 7:
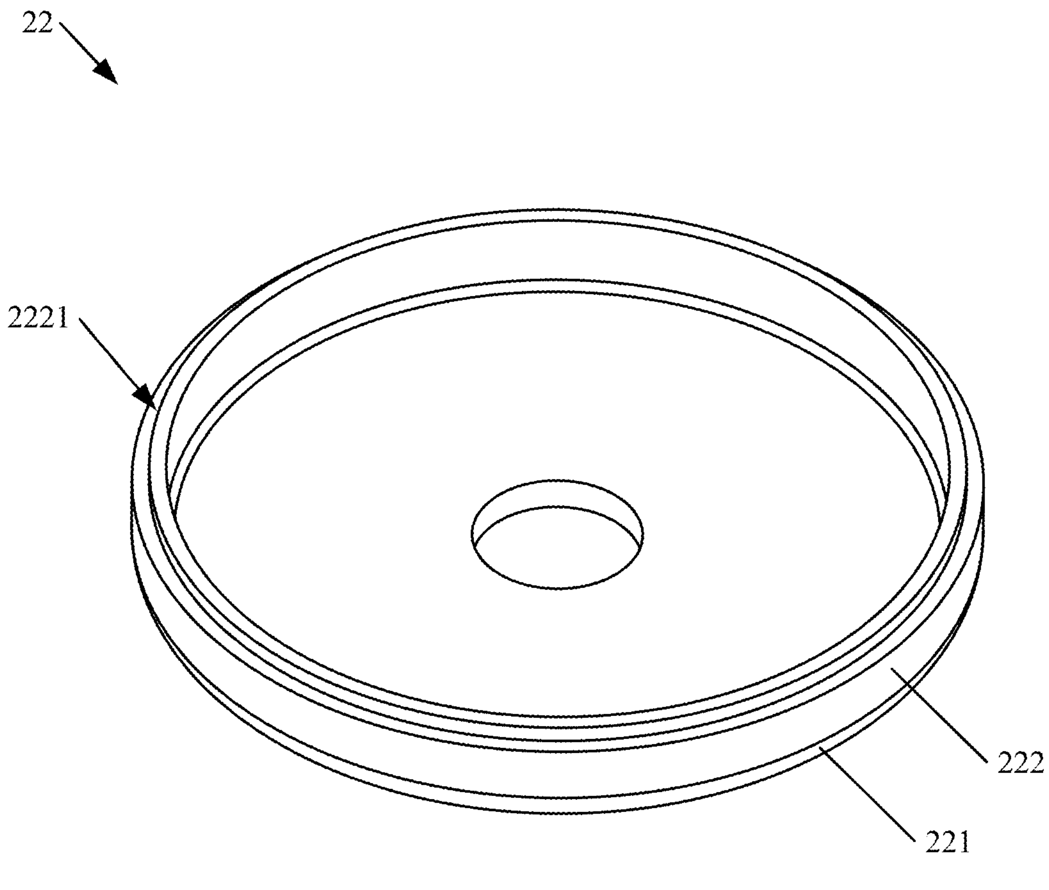
FIG. 7 is a structural diagram of a magnetic bowl provided by an embodiment of the present disclosure.

FIG. 7 is a structural diagram of a magnetic bowl provided by an embodiment of the present disclosure. As shown in FIG. 7, in one embodiment, the magnetic bowl 22 includes a disc-shaped main body part 221 and an annular side part 222 formed by an upward extension of the edge of the main body part 221. It is easy to understand that the first tuning hole 21 runs through the main body part 221 and the magnetic bowl 22 is fixedly connected with the fixing parts 13 through the side part 222. As shown in FIG. 6, a gap 25 is formed between the side part 222 and the magnet 23 as well as the top sheet 24. That is, a magnetic gap area is formed.

Figure 8:
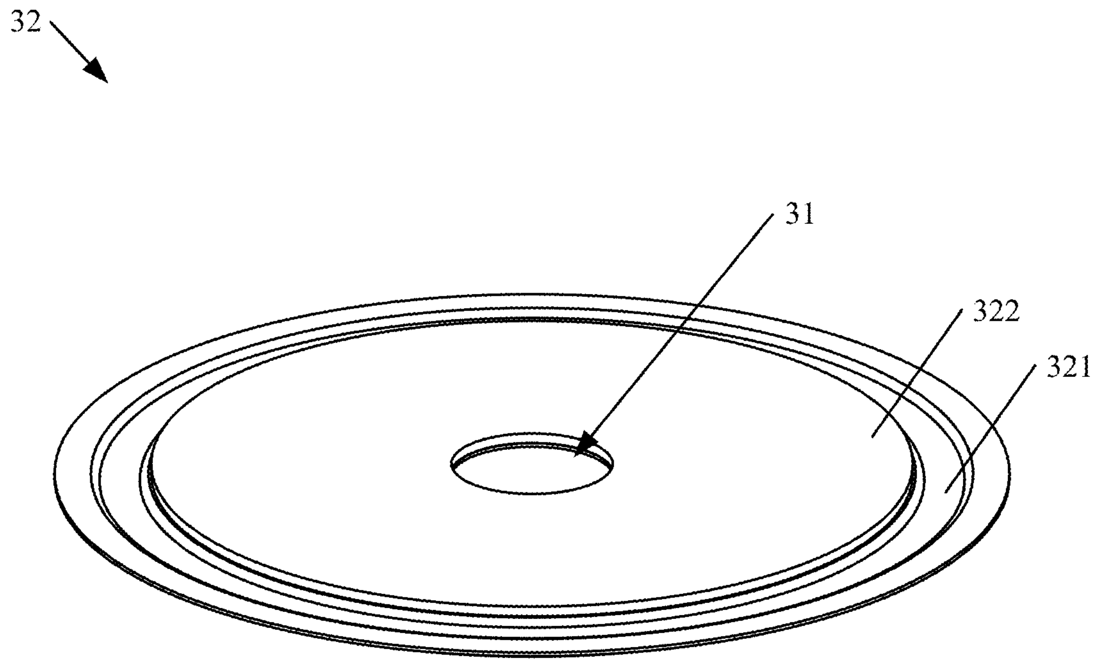
FIG. 8 is a structural diagram of a diaphragm provided by an embodiment of the present disclosure.

As shown in FIG. 2 and FIG. 3, in one embodiment, the diaphragm 32 is connected to the opening of the housing 1. Corresponding to the cylindrical miniature loudspeaker, the diaphragm 32 is set to be circular. It should be noted that diaphragm 32 usually uses thin flake materials with low density and good rigidity, such as paper tray, plastic diaphragm, fiberglass diaphragm and so on. FIG. 8 is a structural diagram of a diaphragm provided by an embodiment of the present disclosure. As shown in FIG. 2 and FIG. 8, the diaphragm 32 is provided with a second tuning hole 31, that is, the second tuning hole 31 runs through the diaphragm 32. Further, As shown in FIG. 2, the voice coil 33 is inserted in the gap 25 formed between the side part 222 and the magnet 23 as well as the top sheet 24. That is, the voice coil 33 is located in the magnetic gap area formed by the magnetic circuit system 2, so that it may be controlled to drive the diaphragm 32 to vibrate. Specifically, according to the electrical signal generated by the external electrical signal generator and transmitted through the conductive connector, the voice coil 33 moves under the action of a magnetic field formed in the magnetic circuit system 2 to drive the diaphragm 32 to vibrate, resulting in a change in the density of the surrounding air.

As shown in FIG. 8, in one embodiment, the diaphragm 32 includes a diaphragm body 321 and a reinforcement member 322 affixed to the diaphragm body 321. The reinforcement member 322 may improve the strength of the central position of the diaphragm 32, thereby stabilizing the vibration posture of the diaphragm 32 and improving the sound quality of the miniature loudspeaker. It should be noted that the second tuning hole 31 runs through the diaphragm body 321 and the reinforcement member 322.

As shown in FIG. 5, in one embodiment, the housing 1 includes a base plate 15 arranged as a disc shape and a side wall 16 formed by an upward extension of the edge of the base plate 15. Further, there is a distance between the base plate 15 and the main body part 221 and there is a distance between the side wall 16 and the side part 222, thereby forming the resonant cavity 11. It is easy to understand that the fixing parts 13 are formed by the side wall 16 extending inward.

As shown in FIG. 7, in one embodiment, the side part 222 is sunken toward the side wall 16 to form a containing groove 2221. It is easy to understand that the fixing parts 13 extend into the containing groove 2221, thereby realizing a fixed connection with the side part 222, that is, installing the magnetic circuit system 2 on the housing 1. It should be noted that the housing 1 of the present embodiment is provided with the fixing parts 13 and the side part 222 is correspondingly provided with a containing groove 2221. As an optional embodiment, the side part 222 is provided with a bulge, and the housing 1 is correspondingly provided with a groove, so that the magnetic circuit system 2 is installed on the housing 1 through the bulge matching the groove.

As shown in FIG. 7, in one embodiment, the containing groove 2221 is located at the top of the side portion 222. It is easy to understand that the containing groove 2221 is set to a ring-shaped structure. Thus, it helps the fixing parts 13 to cooperate with the containing groove 2221, that is, to facilitate the installation of the magnetic circuit system 2.

As shown in FIG. 5, in one embodiment, the fixing parts 13 are arranged as a sheet structure. It is easy to understand that the flake fixing parts 13 have a larger contact area when matched with the containing groove 2221, which helps to improve the installation strength of the fixing parts 13 and the containing groove 2221, thus ensuring that the magnetic circuit system 2 may be securely mounted on the housing 1.

In one embodiment, the flake fixing parts 13 are arranged in a horizontal direction. At the same time, corresponding to the size difference between the side wall 16 and the side part 222, the cross section of each fixing part 13 is isosceles trapezoid. That is, the size of each fixing part 13 gradually decreases from the side wall 16 to the side part 222, so that the fixing parts 13 have sufficient structural strength and the size of each leak 17 is large enough for air flow.

As shown in FIG. 5, in one embodiment, the opening of the housing 1, that is, the top of the side wall 16, is provided with a positioning groove 14. It is easy to understand that the edge of the diaphragm 32 is positioned in the positioning groove 14. Thus, by setting the positioning groove 14, it is helpful to locate and install the diaphragm 32 and avoid quality problems in the miniature loudspeaker due to the installation deviation of the diaphragm 32.

As shown in FIG. 2, in one embodiment, the two ends of the damper 4 are connected to the top sheet 24 and the diaphragm 32, respectively. In particular, as shown in FIG. 4, in one embodiment, the damper 4 includes a supporting part 42, a first connecting part 43 and a second connecting part 44. Specifically, the supporting part 42 is arranged as a ring structure, thereby realizing the formation of a third toning hole 41. Further, the first connecting part 43 extends from the upper end of the supporting part 42 away from the sound guide channel 12 and is connected with the diaphragm 32, that is, with the vibration system 3. Accordingly, the second connecting part 44 extends from the lower end of the supporting part 42 away from the sound guide channel 12 and is connected to the top sheet 24, that is, to the magnetic circuit system 2. Thus, by installing the damper 4 between the magnetic circuit system 2 and the vibration system 3, it is realized that the third tuning hole 41 cooperates with the first tuning hole 21 and the second tuning hole 31 to form a sound guide channel 12.

It is easy to understand with reference to FIG. 2, in one embodiment, the cross section of the supporting part 42 is set to a V-shape. It should be noted that the V-shaped supporting part 42 is sunken in the direction away from the sound guide channel 12. Thus, through the design of the structure of the support section 42, the elastic deformation of the damper 4 may be ensured when the diaphragm 32 is displaced, so that the length of the sound guide channel 12 may be changed, and the resonance frequency may be adjusted.

Figure 9:
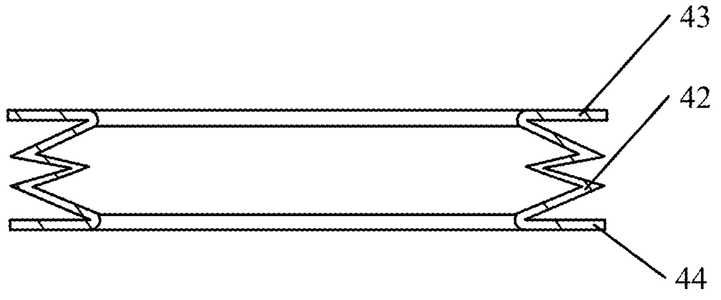
FIG. 9 is a profile diagram of another elastic wave provided by the embodiment of the present disclosure.

FIG. 9 is a profile diagram of another elastic wave provided by the embodiment of the present disclosure. As shown in FIG. 9, in one embodiment, the cross section of the supporting part 42 is set to be serrated. Thus, through the design of the structure of the supporting part 42, the elastic deformation of the damper 4 may be ensured when the diaphragm 32 is displaced, so that the length of the sound guide channel 12 may be changed, and the resonance frequency may be adjusted.

Figure 10:
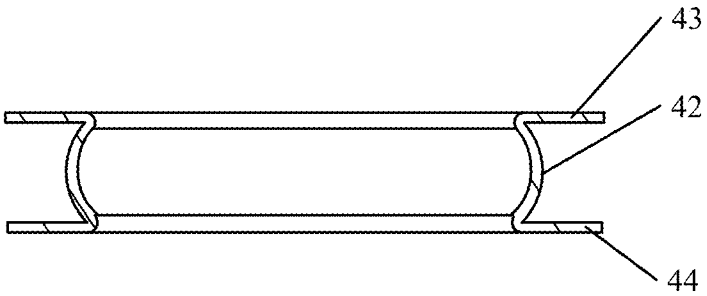
FIG. 10 is a profile diagram of yet another elastic wave provided by the embodiment of the present disclosure.

FIG. 10 is a profile diagram of yet another elastic wave provided by the embodiment of the present disclosure. As shown in FIG. 10, in one embodiment, the cross section of the supporting part 42 is set to a circular arc. It should be noted that the circular arc-shaped supporting part 42 is sunken in the direction away from the sound guide channel 12. Thus, through the design of the structure of the supporting part 42, the elastic deformation of the damper 4 may be ensured when the diaphragm 32 is displaced, so that the length of the sound guide channel 12 may be changed, and the resonance frequency may be adjusted.

It should be noted that the sound guide channel 12 in the present embodiment is arranged as a circular hole as a whole corresponding to the revolving body structure of the miniature loudspeaker in the present embodiment. It is easy to understand with reference to FIG. 2 that, in one embodiment, the first tuning hole 21 and the second tuning hole 31 are set as round holes, and the bore diameter of the first tuning hole 21 is equal to that of the second tuning hole 31.

Figure 11:
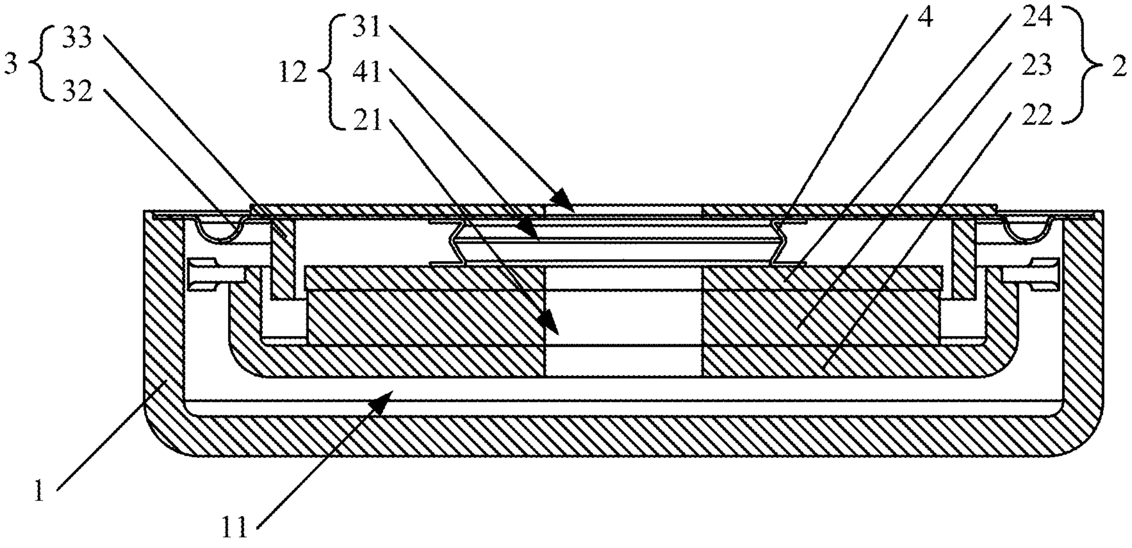
FIG. 11 is a profile diagram of another miniature loudspeaker provided by the embodiment of the present disclosure.

As shown in FIG. 2, in one embodiment, the bore diameter of the third tuning hole 41 is equal to the bore diameters of the first tuning hole 21 and the second tuning hole 31. Thus, the sound wave may be stably transmitted through the straight sound guide channel 12. FIG. 11 is a profile diagram of another miniature loudspeaker provided by the embodiment of the present disclosure. As shown in FIG. 11, in one embodiment, the bore diameter of the third tuning hole 41 is larger than the bore diameters of the first tuning hole 21 and the second tuning hole 31. Thus, the structural change of the sound guide channel 12 is helpful to adjust the sound waves.

Figure 12:
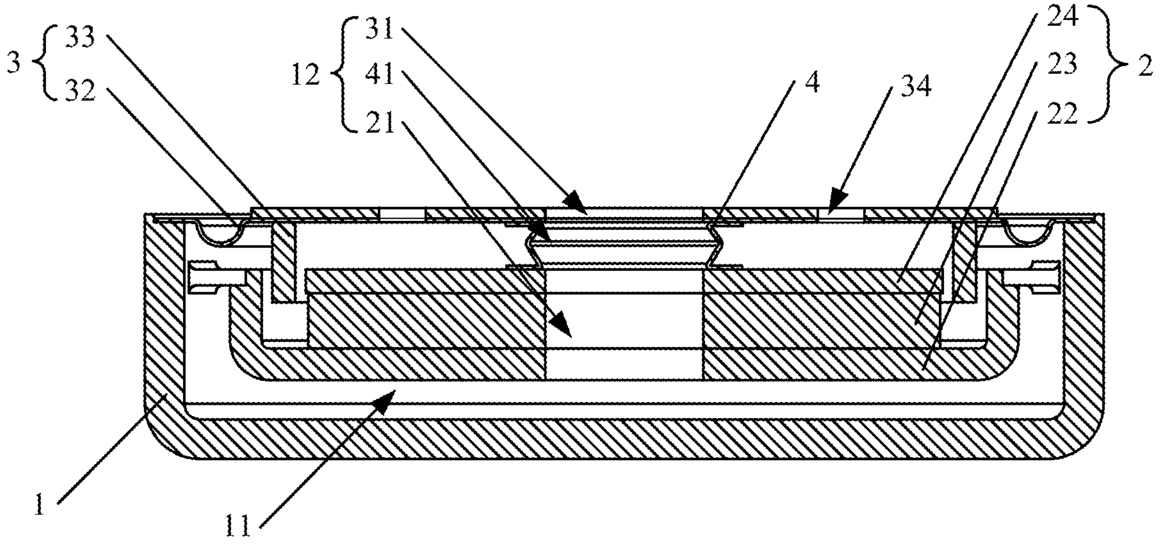
FIG. 12 is a profile diagram of yet another miniature loudspeaker provided by the embodiment of the present disclosure.

FIG. 12 is a profile diagram of yet another miniature loudspeaker provided by the embodiment of the present disclosure. As shown in FIG. 12, in one embodiment, the diaphragm 32 is provided with a plurality of outer through holes 34 connecting the interior and the outside of the miniature loudspeaker around the second tuning hole 31. It should be noted that the outer through holes 34 are distributed in a circular array to avoid polarization of the diaphragm 32 due to interference. Further, the outer through holes 34 run through the diaphragm body 321 and the reinforcement member 322. Thus, a plurality of outer through holes 34 are added to the second tuning hole 31 to facilitate air flow, so that the frequency response of a specific frequency band may be amplified in conjunction with the sound guide channel 12, and the heat dissipation capacity of the miniature loudspeaker may be improved.

Figure 13:
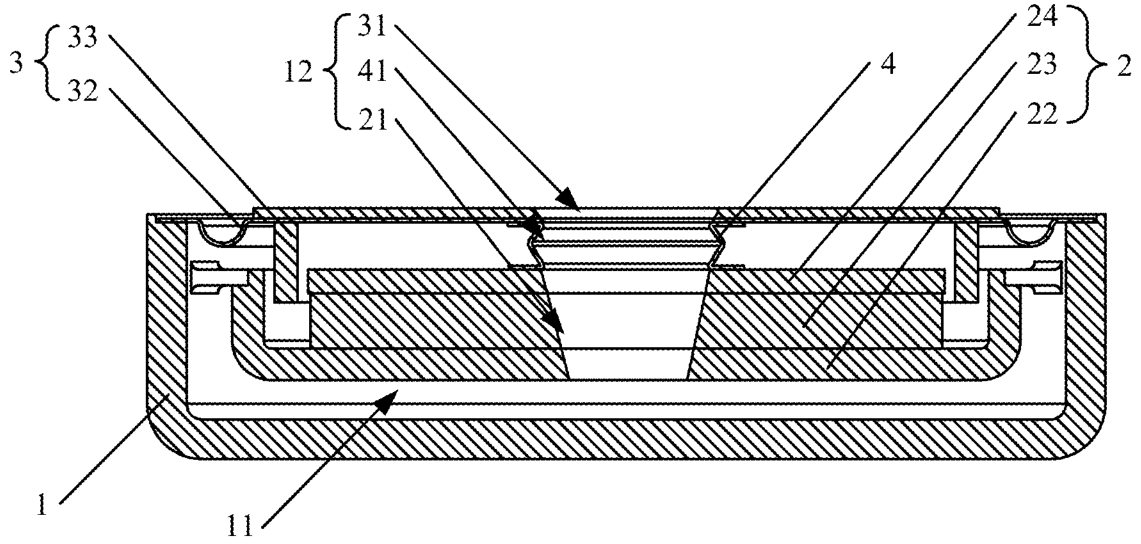
FIG. 13 is a profile diagram of still another miniature loudspeaker provided by the embodiment of the present disclosure.

FIG. 13 is a profile diagram of still another miniature loudspeaker provided by the embodiment of the present disclosure. As shown in FIG. 13, in one embodiment, the first tuning hole 21, the second tuning hole 31 and the third tuning hole 41 jointly form the sound guide channel 12 which is wide at the top and narrow at the bottom. The aperture at one end is reduced through the structure of the tapered through hole, so that the air velocity increases and the pressure decreases, and the other end is expanded, that is, the sound resistance decreases. Therefore, it has the function of playing loudly. In addition, the sound guide channel 12, which is also similar to the structure of the Venturi tube, that is, the injection and suction effect, may accelerate the flow of gas for the use of sound guide design to conduct and superimpose and accelerate the amplification of sound waves in the resonant cavity along the sound production direction. That is, it may improve the sound production efficiency of the miniature loudspeaker.

The embodiment of the disclosure provides a miniature loudspeaker, which comprises a housing, a magnetic circuit system, a vibration system, a damper and a control circuit. The magnetic circuit system is arranged in the accommodating space of the housing, the vibration system is arranged at the opening of the housing and includes a diaphragm and a voice coil, and the two ends of the damper are respectively connected with the magnetic circuit system and the diaphragm. A resonant cavity is formed between the magnetic circuit system and the housing, the magnetic circuit system is provided with a first tuning hole, the diaphragm is provided with a second tuning hole, and the damper is arranged as a ring structure to form a third tuning hole. The first tuning hole, the third tuning hole and the second tuning hole cooperate to form a sound guide channel connecting the outside and the resonant cavity. The control circuit inputs direct-current bias current to the voice coil to adjust the initial position of the diaphragm, and the damper lengthens or shortens with the change of the initial position of the diaphragm so that different direct currents correspond to different lengths of sound guide channels. Thus, by setting a resonant cavity and a variable sound guide channel, the frequency response of a specific frequency band may be amplified under the condition of limiting the size of the miniature loudspeaker, thus achieving the maximum volume output.

The above are only preferred embodiments of the disclosure and are not used to limit the disclosure. For those skilled in the art, the disclosure can have various changes and changes. Any modification, equivalent replacement, improvement, etc., made within the spirit and principle of the present disclosure shall be included in the scope of protection of the present disclosure.

I claim:

1. A loudspeaker, comprising:

a housing, with an opening at the top to form an accommodating space;

a magnetic circuit system disposed in the accommodating space, having a spacing from the housing to form a resonant cavity, and being provided with a first tuning hole communicating with the resonant cavity;

a vibration system, disposed at the opening of the housing and comprising a diaphragm and a voice coil, the diaphragm being provided with a second tuning hole communicating with the outside;

a damper, configured as a ring structure to form a third tuning hole, two ends of the spring wave being respectively connected to the magnetic circuit system and the diaphragm; and a control circuit, configured to input a direct-current bias current to the voice coil to adjust an initial position of the diaphragm;

wherein the first tuning hole, the third tuning hole, and the second tuning hole cooperate to form a sound guiding channel, and the damper extends or shortens following the change of the initial position of the diaphragm to make different direct currents correspond to different lengths of the sound guiding channel.

2. The loudspeaker according to claim 1, wherein the housing is provided with at least one fixing part, and the housing is fixedly connected to the magnetic circuit system through the fixing part.

3. The loudspeaker according to claim 2, wherein the magnetic circuit system comprises:

a magnetic bowl, having a spacing from the housing to form the resonant cavity, and being fixedly connected to the fixing part;

a magnet, disposed above the magnetic bowl; and a top sheet, disposed above the magnet;

wherein the first tuning hole penetrates through the magnetic bowl, the magnet, and the top sheet.

4. The loudspeaker according to claim 3, wherein both ends of the damper are respectively connected to the top sheet and the diaphragm.

5. The loudspeaker according to claim 3, wherein the magnetic bowl comprises: a main body part; and a side part, extending upward from the edge of the main body part, and fixedly connected to the fixing part; a side part, extending upward from the edge of the main body part, and fixedly connected to the fixing part.

6. The loudspeaker according to claim 5, wherein the housing comprises:

a base plate, having a distance from the main body part; and a side wall, extending upward from the edge of the base plate, having a distance from the side part, and extending inward to form the fixing part.

7. The loudspeaker according to claim 6, wherein the side part is recessed on one side facing the side wall to form a containing groove; and the fixing part extends into the containing groove to be fixedly connected to the side part.

8. The loudspeaker according to claim 7, wherein the containing groove is located at the top of the side part.

9. The loudspeaker according to claim 2, wherein a plurality of the fixing parts are arranged at intervals to cooperate with the magnetic circuit system to form leaks that communicate with the resonant cavity.

10. The loudspeaker according to claim 1, wherein the first tuning hole, the second tuning hole, and the third tuning hole jointly form the sound guide channel that is wide at the top and narrow at the bottom.

11. The loudspeaker according to claim 1, wherein a positioning groove is provided at the opening of the housing; and the edge of the diaphragm is positioned in the positioning groove.

12. The loudspeaker according to claim 1, wherein the damper comprises:

a support part, arranged in a ring structure;

a first connection part, extending from the upper end of the support part in a direction away from the sound guide channel, and connected to the diaphragm; and a second connection part, extending from the lower end of the support part in a direction away from the sound guide channel, and connected to the magnetic circuit system.

13. The loudspeaker according to claim 12, wherein the cross section of the support part is set to be V-shaped and recessed in the direction away from the sound guide channel.

14. The loudspeaker according to claim 12, wherein the cross section of the support part is set to be serrated.

15. The loudspeaker according to claim 12, wherein the cross section of the support part is set to be circular arc-shaped, and is recessed towards the direction away from the sound guide channel.

16. The loudspeaker according to claim 1, wherein the diaphragm comprises:

a diaphragm body; and a reinforcement member, attached to the diaphragm body;

wherein the second tuning hole penetrates through the diaphragm body and the reinforcement member.

17. The loudspeaker according to claim 1, wherein the loudspeaker is provided with a revolving body structure.

18. The loudspeaker according to claim 1, wherein the bore diameter of the first tuning hole is equal to the bore diameter of the second tuning hole.

19. The loudspeaker according to claim 18, wherein the bore diameter of the third tuning hole is equal to the bore diameters of the first tuning hole and the second tuning hole.

20. The loudspeaker according to claim 18, wherein the bore diameter of the third tuning hole is larger than the bore diameters of the first tuning hole and the second tuning hole.

* * * * *